(12) United States Patent
Kakutani

(10) Patent No.: US 8,437,049 B2
(45) Date of Patent: May 7, 2013

(54) IMAGE FORMING METHOD AND APPARATUS FOR PREVENTING ILLEGAL COPYING OF PRINTED DOCUMENTS

(75) Inventor: Naoya Kakutani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 505 days.

(21) Appl. No.: 12/823,482

(22) Filed: Jun. 25, 2010

(65) Prior Publication Data

US 2010/0328728 A1    Dec. 30, 2010

(30) Foreign Application Priority Data

Jun. 29, 2009   (JP) ................................. 2009-153315

(51) Int. Cl.
*H04N 1/40*   (2006.01)
(52) U.S. Cl.
USPC .......... 358/448; 358/1.9; 358/1.15; 358/3.28; 358/474; 358/540
(58) Field of Classification Search .................. None
See application file for complete search history.

(56) References Cited

U.S. PATENT DOCUMENTS

| | | | |
|---|---|---|---|
| 6,548,768 B1 | 4/2003 | Pettersson et al. | |
| 8,023,127 B2 * | 9/2011 | Matsunoshita | 358/1.14 |
| 8,081,348 B2 * | 12/2011 | Hosoda | 358/3.28 |
| 8,115,941 B2 * | 2/2012 | Takahashi | 358/1.14 |
| 8,191,765 B2 * | 6/2012 | Matsumura | 235/375 |
| 8,233,170 B2 * | 7/2012 | Tanaka | 358/1.14 |
| 8,310,691 B2 * | 11/2012 | Hikichi | 358/1.14 |
| 8,314,955 B2 * | 11/2012 | Sato | 358/1.14 |
| 2005/0078331 A1 * | 4/2005 | Guan et al. | 358/1.14 |
| 2005/0141010 A1 * | 6/2005 | Kanai | 358/1.14 |
| 2007/0171452 A1 * | 7/2007 | Matsunoshita | 358/1.14 |
| 2008/0297853 A1 | 12/2008 | Yang et al. | |
| 2009/0066977 A1 | 3/2009 | Yoshida | |
| 2009/0244653 A1 * | 10/2009 | Hashimoto | 358/474 |
| 2009/0268259 A1 * | 10/2009 | Kikuchi | 358/468 |
| 2010/0060923 A1 * | 3/2010 | Kakutani | 358/1.14 |

FOREIGN PATENT DOCUMENTS

JP    2002-305646 A    10/2002

* cited by examiner

*Primary Examiner* — Dung Tran
(74) *Attorney, Agent, or Firm* — Carter, DeLuca, Farrell & Schmidt LLP

(57) ABSTRACT

An image forming apparatus includes a LVBC extraction unit configured to make a determination as to copy restriction based on the LVBC, a copy restricted image pattern analysis unit configured to make a determination as to the copy restriction based on the copy restricting information, a job control unit configured to decide whether the copying of the copy target image is permitted or prohibited by referring to the determination result by the copy restricted image pattern analysis unit based on the determination result of the LVBC extraction unit, and a print unit configured to output the copy target image in a case where the deciding unit decides that the copying of the copy target image is permitted.

13 Claims, 14 Drawing Sheets

IMAGE FORMING METHOD AND APPARATUS FOR PREVENTING ILLEGAL COPYING OF PRINTED DOCUMENTS

BACKGROUND OF THE INVENTION

1. Field of the Invention

The present invention relates to an image forming apparatus, an image forming method and a program thereof, which can prevent a printed document from being illegally copied.

2. Description of the Related Art

In order to prevent a printed document from being illegally copied, the following method is proposed. In creating the document, a copy condition whether or not the document is in a state of "copy prohibition" is embedded within the document in the form of image data and the document is printed out. On the other hand, in copying the document, a copying machine detects the copy condition from the printed document and controls a copying operation according to the copy condition (i.e., an execution of the copying operation and a stop of the copying operation).

For example, Japanese Patent Application Laid-open No. 2002-305646 discusses a method in which a copying machine includes a unit for detecting a specific symbol (e.g., a two-dimensional code) and a secrecy level from the document to be copied, and in a case where the specific symbol is detected, the copying machine further detects the secrecy level to control the copying operation according to the secrecy level. According to this method, only by judging whether or not the specific symbol is included in the document to be copied, a determination can be made as to whether or not control of the copying operation is necessary with respect to the document.

On the other hand, there also is a method in which the image forming apparatus preliminary stores information as to a key word and image pattern that are used in restricting the copying and compares the information with information of all the documents input, thereby restricting the copying.

However, with the method of Japanese Patent Application Laid-open No. 2002-305646, copying of the print product, which contains no two-dimensional code, cannot be restricted. In a case where information as to the keyword and the image pattern that restrict the copying is stored, and the information is compared with the information of all the documents input, if the key word and the image pattern which are to be preliminary stored in the print product to be copied are not included in the print product, the copying cannot be restricted. As described above, in either one of the methods, only a specific print product could be restricted from being copied, so that there was a problem that the print product of which copying had to be prohibited was illegally copied.

SUMMARY OF THE INVENTION

According to an aspect of the present invention, an image forming apparatus includes a first determination unit configured to make a determination as to copy restriction of a copy target image based on a two-dimensional code which is contained in the copy target image generated from a print product and into which information that a user cannot recognize as a content in the print product is embedded, a second determination unit configured to make a determination as to copy restriction of the copy target image based on copy restricting information that is contained in the copy target image and that the user can recognize as a content in the print product, a deciding unit configured to decide that a determination result by the second determination unit is referred to in a case where the first determination unit determines that the two-dimensional code is not contained in the copy target image, that copying of the copy target image is permitted in a case where the second determination unit determines that the coping of the copy target image is permitted, and that the copying of the copy target image is prohibited in a case where the second determination unit determines that the copying of the image to be copied is prohibited and, an output unit configured to output the copy target image in a case where the deciding unit decides that the copying of the copy target image is permitted.

According to the present invention, an image forming apparatus can prohibit copying of a print product, of which copying needs to be prohibited, at a high accuracy, so that more of illegal copying can be prevented.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

The scope of the present invention is not limited to the relative disposition of composition elements, formulas, values and the like described in the exemplary embodiments as far as it is not specified here.

In the first exemplary embodiment, the image forming apparatus uses a two-dimensional code in order to prevent an illegal copying.

Figure 1:
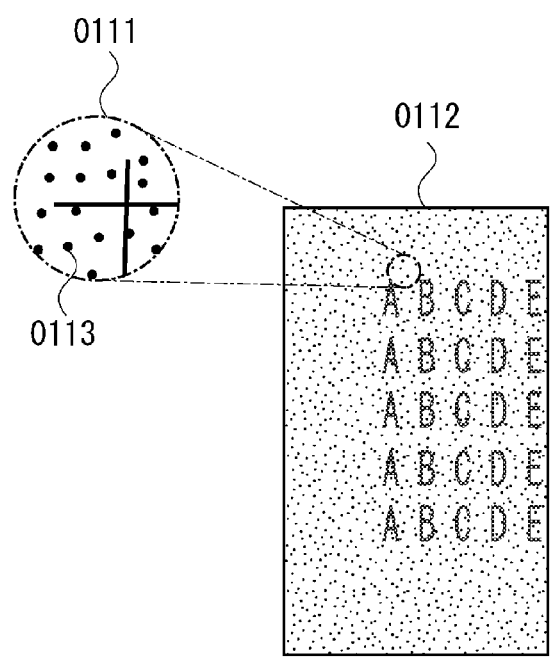
FIG. 1 illustrates an example of a document into which a low visibility bar code (LVBC) is embedded.

FIG. 1 illustrates an appearance of a print product 0112 containing a first two-dimensional code into which additional information is embedded. In the present exemplary embodiment, the first two-dimensional code is sometimes referred to as a Low Visibility Barcode, i.e., a Low Visibility two-dimensional code. A portion of the print product 0112 is enlarged in a partial view 0111. As it is seen from the enlarged partial view 0111, the print product includes a portion of a character (i.e., a portion of A) and an LVBC 0113 so as to be printed on the print product. A user who copies cannot recognize contents contained in the LVBC.

Figure 2:
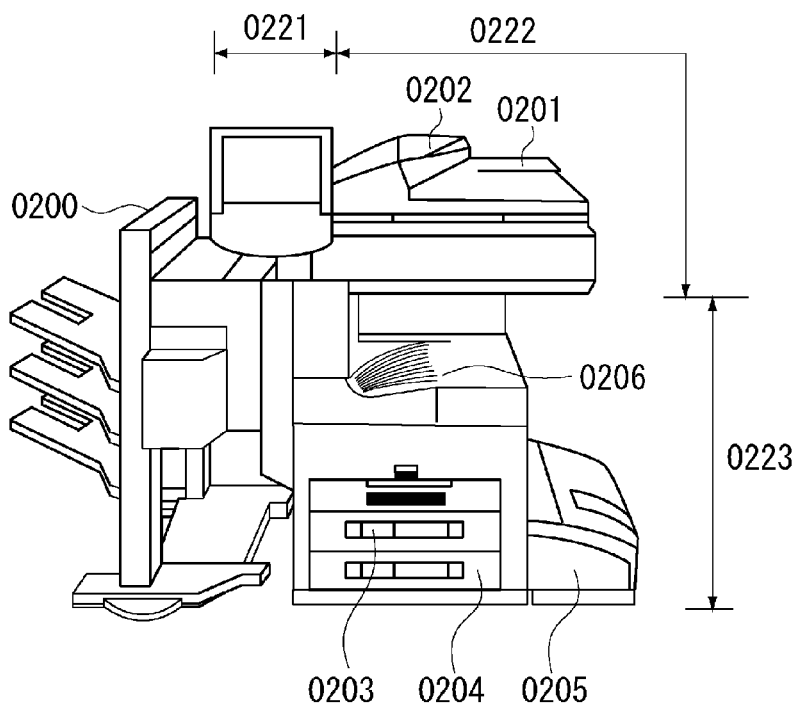
FIG. 2 illustrates an example of an appearance of an image forming apparatus.
Figure 3:
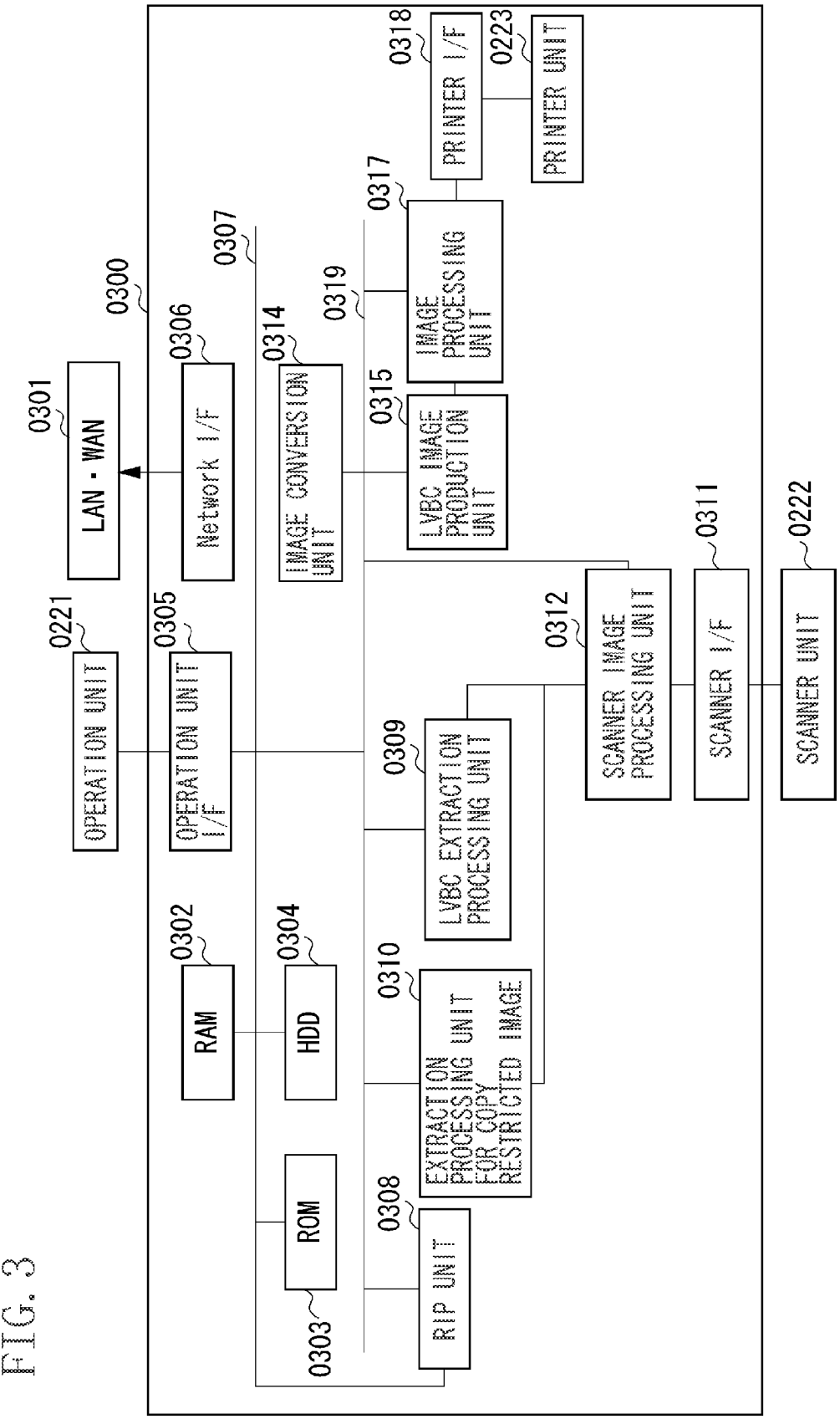
FIG. 3 is a block diagram illustrating an interior configuration of the image forming apparatus.

FIG. 2 illustrates an appearance of an image forming apparatus 0200 which is applied to the present exemplary embodiment. FIG. 3 is a block diagram illustrating an interior configuration of a controller 0300 within the image forming apparatus 0200. Description is made as to the image forming apparatus 0200 with reference to FIGS. 2 and 3.

The image forming apparatus 0200 includes an operation unit 0221 configured to provide a user interface screen, a scanner unit 0222, a printer unit 0223 and a controller 0300 configured to control the apparatus in its entirety. The scanner unit 0222 includes a tray 0202 and a document feeder 0201. When the user sets a document to be copied (a print product) to the tray 0202 of a document feeder 0201 and gives an instruction to start reading the document through the operation unit 0221, the controller 0300 issues a document reading instruction to the scanner unit 0222. The scanner unit 0222 which receives the document reading instruction automatically feeds the document sheet by sheet from the tray 0202 and reads the document to obtain data of an image to be copied. A method of reading the document is not limited to a configuration in which the document is automatically fed, but as the method of reading, the document may be placed on a glass surface to cause an exposure unit to move to scan the document. The printer unit 0223 forms the image to be copied, which was received from the controller 0300, on a sheet. The printer unit 0223 is provided with a plurality of sheet cassettes 0203, 0204 and 0205 which enable a selection of a different sheet size and/or a different sheet orientation. After the sheet is printed, it is output to a discharge tray 0206 as a final output product.

The controller 0300 controls the scanner unit 0222 and the printer unit 0223. Further, the controller 0300 controls data communication between a client's personal computer (PC) and a printer server through the local area network (LAN) or a wide area network (WAN). A random access memory (RAM) 0302 is a system work memory for operating an extraction processing unit 0310 for a copy restricted image and also is a memory which temporarily stores data of the image to be copied. A read-only memory (ROM) 0303 stores a boot program of the apparatus. A hard disk drive (HDD) 0304 stores system software and the data of the image to be copied.

An operation unit interface (I/F) 0305 establishes a connection between a system bus 0307 and the operation unit 0221. The operation unit I/F 0305 receives the data of the image to be copied from the system bus 0307 in order to display the data on the operation unit 0221 and outputs the data to the operation unit 0221. Further, the operation unit interface (I/F) 0305 outputs information input from the operation unit 0221 to the system bus 0307. A Network I/F 306 is an interface board which establishes a connection between the LAN/WAN 0301 and the system bus 0307. An image bus 0319 is a transmission path for transmitting the data of the image to be copied and includes a PCI bus or a universal serial bus (USB). A scanner image processing unit 0312 transfers the data of the image to be copied, which was received from the scanner unit 0222 through the scanner I/F 0311, to an LVBC extraction processing unit 0309 and the extraction processing unit 0310 for a copy restricted image, respectively. Further, the scanner image processing unit 0312 corrects, processes and edits the data of the image to be copied.

The LVBC extraction processing unit 0309 detects additional information that is embedded in the LVBC 0113 from the LVBC 0113 contained in the data of the image to be copied and decodes thus detected additional information. Detailed descriptions of a content of the additional information embedded in this LVBC 0113, the detection processing and the decoding processing of the additional information by the LVBC extraction processing unit 0309 are made later.

The extraction processing unit 0310 for a copy restricted image extracts copy restricting information such as an image pattern and a keyword, which restricts copying of the image, from the data of the image to be copied. The copy restricting information extracted here is information of which content can be recognized by the user in the original document of the data of the image to be copied. The extraction processing of the image pattern and the keyword, which restrict the copying of the image, are described later in detail. The detection of the LVBC 0113 and the extraction of the copy restricting information are carried out by a central processing unit (CPU) of the controller based on a control program stored in the ROM 0303 or the HDD 0304. The copy restricting information indicative of restriction of the copying is stored in the HDD 0304.

Since a calculation cost of the detection and the decode of the LVBC are high, if the detection and the decode are carried out by using the CPU of the image forming apparatus, processing time may be increased and/or the other processing may be affected. Therefore, in the LVBC extraction processing unit 0309 of the present exemplary embodiment, the detection processing and the decode processing are carried out by hardware. This hardware includes a field programmable gate array (FPGA), an application specific integrated circuit (ASIC) or the CPU. On the other hand, the extraction processing of the copy restricting information is carried out by software.

An image processing unit 0317 refers to attribute data attached to the received data of the copy target image and performs image processing on the data of the copy target image. An LVBC image production unit 0315 produces the LVBC into which the additional information is embedded. The image processing unit 0317 can synthesize the LVBC produced by the LVBC image production unit 0315 with the data of the image to be copied. The processing by the above described image processing unit 0317 and the LVBC image production unit 0315 are carried out by the CPU of the controller based on a control program stored in the ROM 0303 or the HDD 0304.

An image conversion unit 0314 provides a predetermined conversion processing such as a rotation, a color space conversion, a binary-to-multivalued conversion, an image synthesis and thinning with respect to the data of the image to be copied. A raster image processor (RIP) unit 0308 receives intermediate data generated based on a page description language (PDL) code data received from a client's personal computer (PC) 1001 to generate bit map data. Thus generated bit map data is transmitted to an image bus 0319.

Now, in the image forming apparatus 0200, processing for adding the LVBC to the print product to be output is described below.

Figure 4:
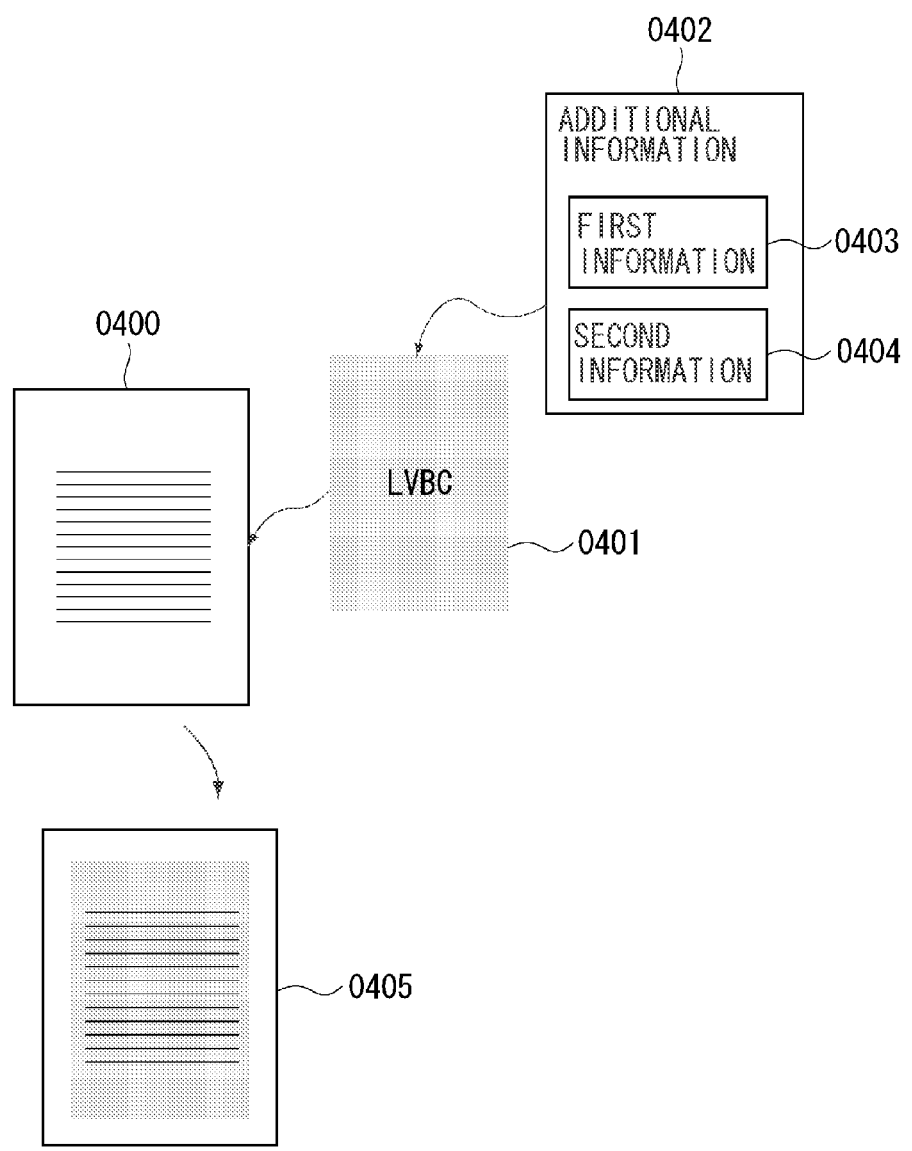
FIG. 4 illustrates first information and second information to be embedded in the LVBC.

When the user issues a print instruction of the data of the print target image in the client's PC, the client's PC generates print data and transmits the print job including the print data to the image forming apparatus 0200. The image forming apparatus 0200 converts the print data included in thus received print job into data of image to be printed and prints the data of the print target image onto the sheet, thereby outputting the print product. Here, when the user performs an operation to issue the print instruction in the client's PC, the user further issues an instruction for adding the LVBC to the data of the image to be printed. Upon receiving this instruction, the client's PC generates a print job including information indicative of a setting for adding the LVBC to the data of the print target image and transmits the print job to the image forming apparatus. The image forming apparatus 0200 adds the LVBC to the data of the image to be copied according to the information indicative of the setting for adding the LVBC contained in the print job to the data of the print target image. FIG. 4 illustrates additional information 0402 to be embedded in an information pattern 0401 of the LVBC. The additional information 0402 of the LVBC contains first information 0403 (e.g., copy control information in the present exemplary embodiment) and second information 0404 (e.g., tracking information having a history of print job in the present exemplary embodiment). Here, an information pattern 0401 of the LVBC is a pattern in which the additional information 0402 is imaged by the LVBC image production unit 0315. The additional information 0402 contains data in which 2-channel data of the first information 0403 and the second information 0404 are encoded. A channel of the first information 0403 corresponds to the following LDD channel. The first information 0403 is used as copy control information for controlling an output of the image data obtained by a scan in response to detection at the time of the scanning operation carried out later, so that the first information 0403 should be extracted speedily. The second information 0404 contains information for tracking a printing person who is printing a print product 0405. The tracking information contains information in printing, for example, a print date, a name of the user who gave an instruction for the printing and a device name. The channel of this data corresponds to the following HDD channel.

By using the LVBC, a combination of the first information and the second information can be embedded into the image as the additional information. The LVBC can be selectively extracted. Namely, only the LVBC of the first information, only the LVBC of the second information or either one of the first information or the second information according to how to use it can be extracted. How to embed or how to extract the additional information by using the LVBC is described below.

When the user uses the image forming apparatus 0200 to copy the print product into which the LVBC is embedded, the image forming apparatus 0200 detects that the LVBC is included in the print product. Then, the image forming apparatus 0200 controls the copying operation according to the copy condition contained in copy control information in the additional information embedded in the detected LVBC. For example, if the copy condition indicates "copy prohibition", the image forming apparatus 0200 stops the copying operation. Accordingly, the print product of which copying is prohibited can be prevented from being copied.

Now, setting processing of the copy control information in the client's PC and control of the copying operation in the image forming apparatus 0200 are described in detail.

Figure 5:
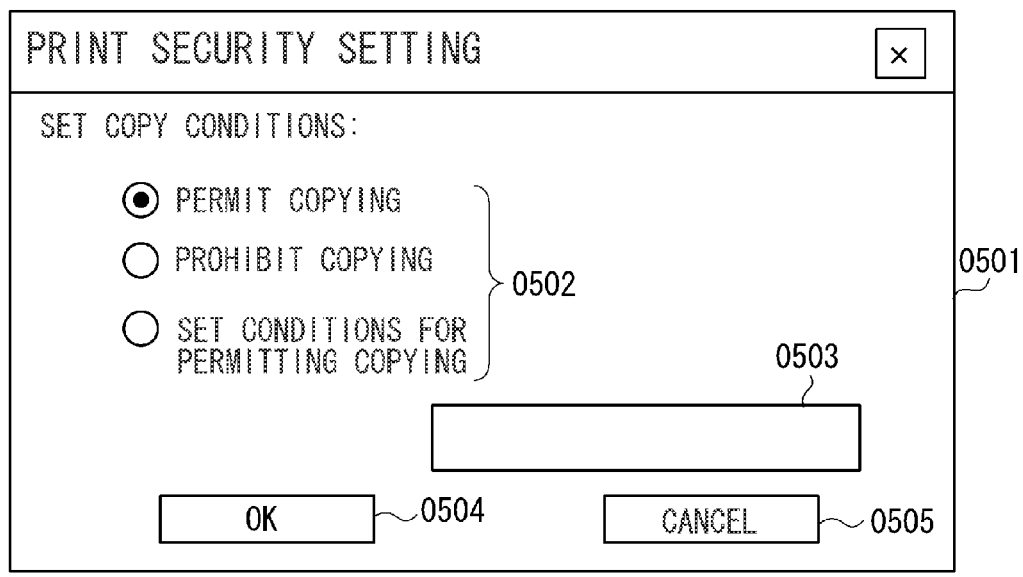
FIG. 5 illustrates an example of a screen for setting a printer driver.

FIG. 5 illustrates an example of a print setting screen provided by a printer driver installed in the client's PC.

FIG. 5 illustrates a print security setting dialog box 501. The user sets the copy condition by using the print security setting dialog box 501. The user fills a check mark in a radio button 0502 within the print security setting dialog box 0501. Thereby, the user selects one of the conditions of "permit copying", "prohibit copying" and "setting conditions for permitting copying". Thus selected condition is embedded in the print job of the image to be printed as copy control information. When the "setting conditions for permitting copying" is selected by the user, the condition information input field 0503 can input conditions. The user inputs the condition information into the condition information input field 0503. This condition information is also embedded in the print job of the image to be printed as copy control information. Examples of the condition information include user authentication information and password information. When the user attempts to copy the print product into which the "setting conditions for permitting copying" is embedded by using the image forming apparatus 0200, the image forming apparatus 0200 encourages the user to input the condition information. In this case, when the user inputs the condition information which is input into the condition information input field 0503 when print setting is made in the image forming apparatus 0200, the copying is permitted to the user. The condition information may be a name of the user whom copying is permitted. Further, the condition information may include a copy permittable period (e.g., from Jan. 1, 2009 to Jan. 31, 2009). When the copy permittable period is set as the condition information, the image forming apparatus 0200 performs control to permit the copying only within the period.

Figure 6:
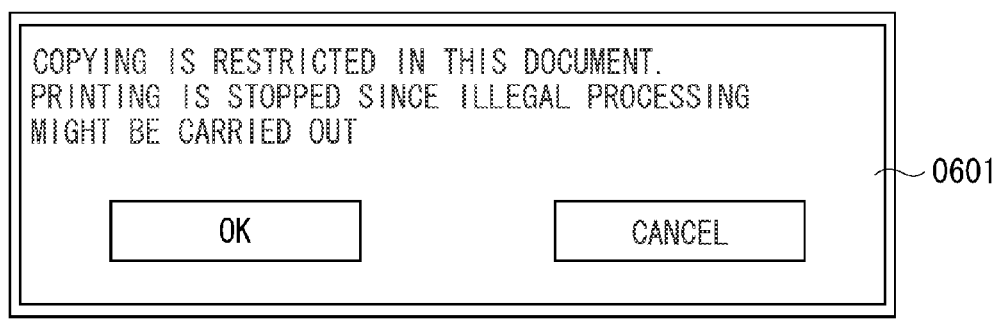
FIG. 6 illustrates an example of a screen displayed when the image forming apparatus stops a copying operation.
Figure 7:
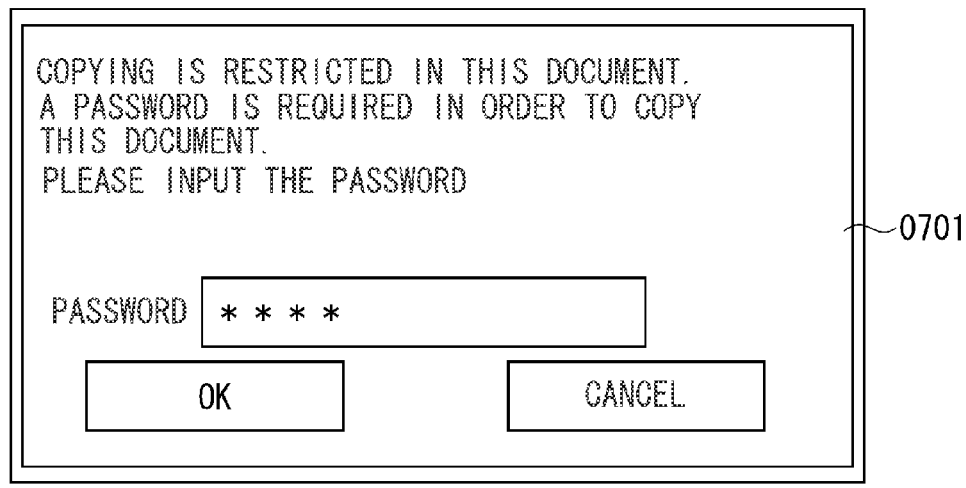
FIG. 7 illustrates an example of a screen displayed when the image forming apparatus temporarily stops the copying operation.

FIGS. 6 and 7, respectively, illustrates an example of a dialog box to be provided to the user by the image forming apparatus 0200 which detected that the copy condition of the "prohibit copying" or the "specify a condition to permit copying" as the copy control information is embedded in the print product to be copied. Each dialog box is displayed on the operation unit 0221 of the image forming apparatus 0200.

FIG. 6 illustrates a dialog box 0601 displayed on the operation unit 0221 when the user attempts to copy the printed document into which the "prohibit copying" is embedded as the copy control information. When the image forming apparatus 0200 detects that the copy control information indicative of the "prohibit copying" is embedded in the printed document to be copied, the image forming apparatus 0200 notifies a message indicating that copying of the printed document is not carried out, to the user. Therefore, the user who receives this notification gives up copying the printed document.

FIG. 7 illustrates a dialog box 0701 displayed on the operation unit 0221 when the user attempts to copy the document into which copy control information indicative of "specify a condition to permit copying" is embedded as the copy control information. When the image forming apparatus 0200 detects that copy control information indicative of "set a condition to permit copying" is embedded in the printed document to be copied, the image forming apparatus 0200 notifies the user of a massage indicating that an input of a password is required in order to copy the document. The user who receives this notification inputs the password by using a keyboard of the operation unit 0221, IC card or the like. Then, the image forming apparatus 0200 cross checks the password embedded in the printed document as the copy control information with the password input by the user. If the passwords match to each other, copying operation is carried out. To the contrary, if the passwords do not match to each other, i.e., the password authentication ends in error, a dialog box 0601 illustrated in FIG. 6 is displayed on the operation unit 0221.

Now, an example of a method in which the first information 0403 and the second information 0404 are embedded into the print product 0405 by the LVBC image production unit 0315 during the print processing is described below, with reference to FIGS. 8, 9 and 10. The method for embedding the first information 0403 and the second information 0404 into the print product 0405 is not limited to the below described methods but another method may be employed.

Figure 8:
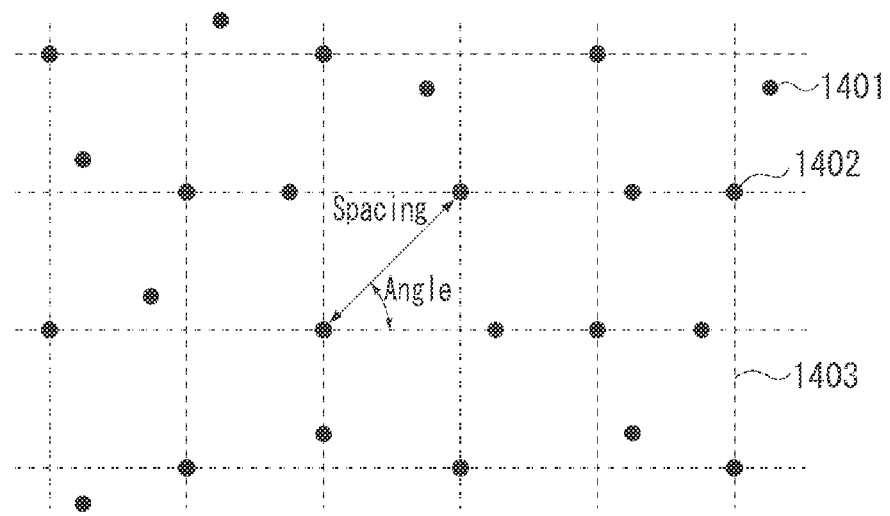
FIG. 8 illustrates a grid of dots where information is embedded.

FIG. 8 illustrates an example how data dots 1401 and aligned dots 1402 are located. A reference grid 1403 is formed with aligned dots and the data dots are adjusted with reference to the reference grid 1403.

Figure 9:
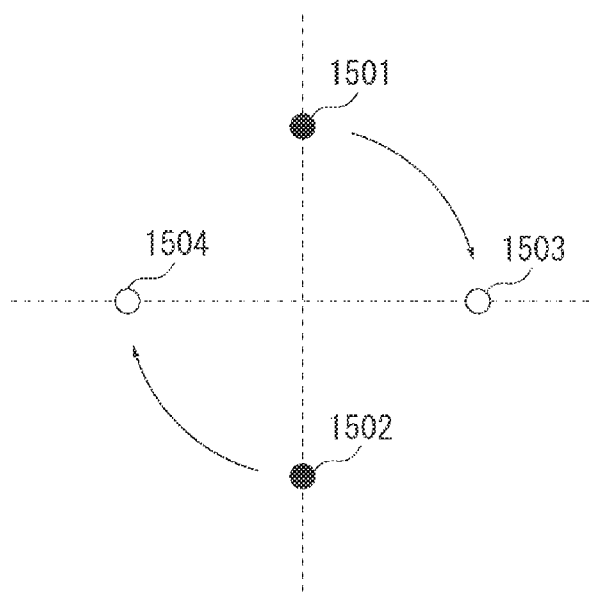
FIG. 9 illustrates a correction of a grid rotation angle.

As illustrated in FIG. 9, the dots 1501 and 1502 are rotated by 90 degrees in order to calculate coordinates 1503 and 1504. In the present exemplary embodiment, 2-channel data are stored at the same time in a single LVBC information pattern 0401. The additional information 0402 is repeatedly tiled on throughout the grids.

Figure 10:
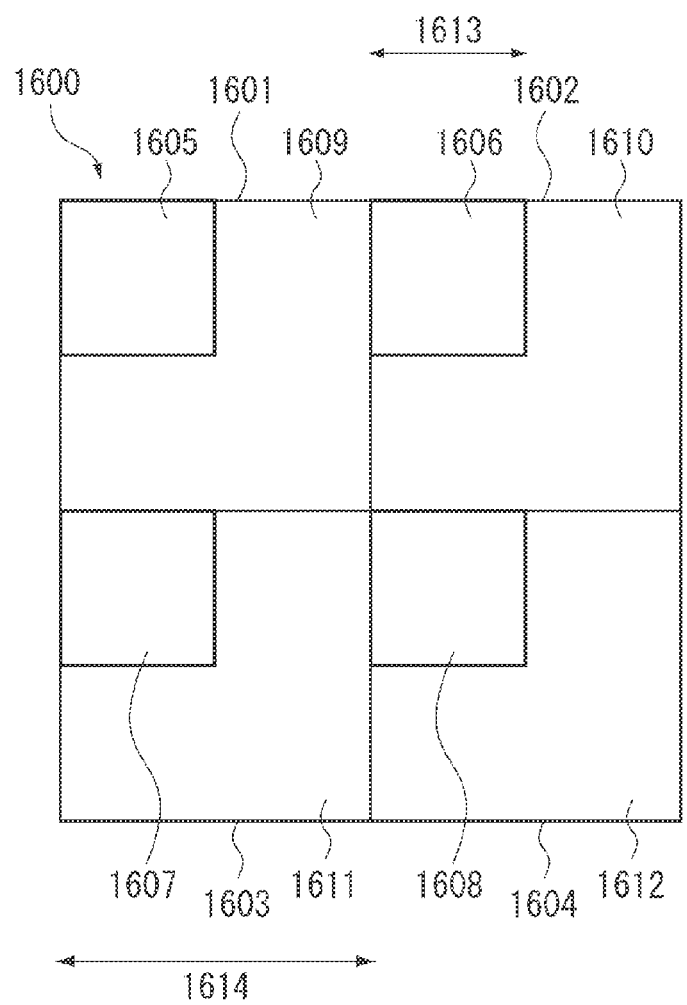
FIG. 10 illustrates tiles and a tiling layout.

FIG. 10 illustrates a single unique tile 1600 and a tiling location. The tile 1600 includes two kinds of channels such as a high density data channel (i.e., HDD channel) and a low density data channel (i.e., LDD channel). The HDD channel has a lower robustness, whereas the LDD channel has a higher robustness. Further, the tile 1600 includes four sub tiles 1601, 1602, 1603 and 1604 which are HDD channel tiles. Each of the HDD channel tiles has a square grid shape having a dimension of 1614 per a unit of a grid cell or a data dot (hereinafter referred to as the "HD tile size"). Each of the HDD channel tiles includes a piece of embedded small tile which is referred to as the LDD channel tile. The tile 1600 includes LDD channel tiles 1605, 1606, 1607 and 1608. This means that the tile 1600 includes four copies of the LDD channel tiles.

Each of the LDD channel tiles has a square grid shape having a dimension of 1613 per a unit of the grid cell or the data dot (hereinafter referred to as the "LDD tile size"). Additionally, the HDD channel occupies a complete area of the four HDD channel tiles except for the LDD channel tiles. That means the tile 1600 includes only a single copy of the HDD channel. For example, areas 1609, 1610, 1611 and 1612 collectively form the HDD channel. The number of HDD channel tiles to be used in storing the HDD channels can be increased as required. An error correction code (ECC) is applied to data of both of the LDD channel and the HDD channel. In the present exemplary embodiment, a low density parity check (LDPC) code is used as the ECC. The LDPC is a high performance ECC which is publicly known.

Figure 11:
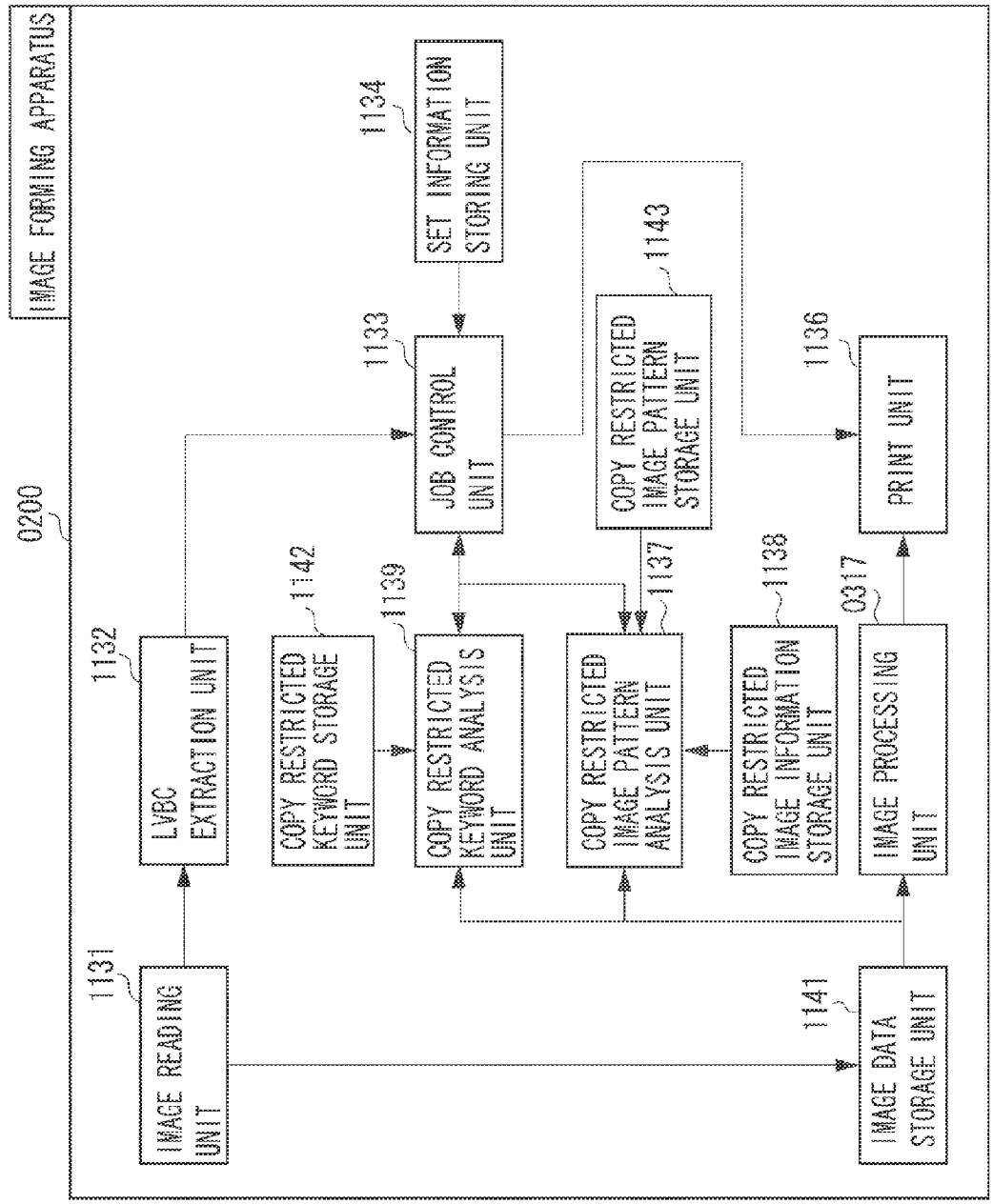
FIG. 11 is a block diagram illustrating a function of copy control within the image forming apparatus.
Figure 12:
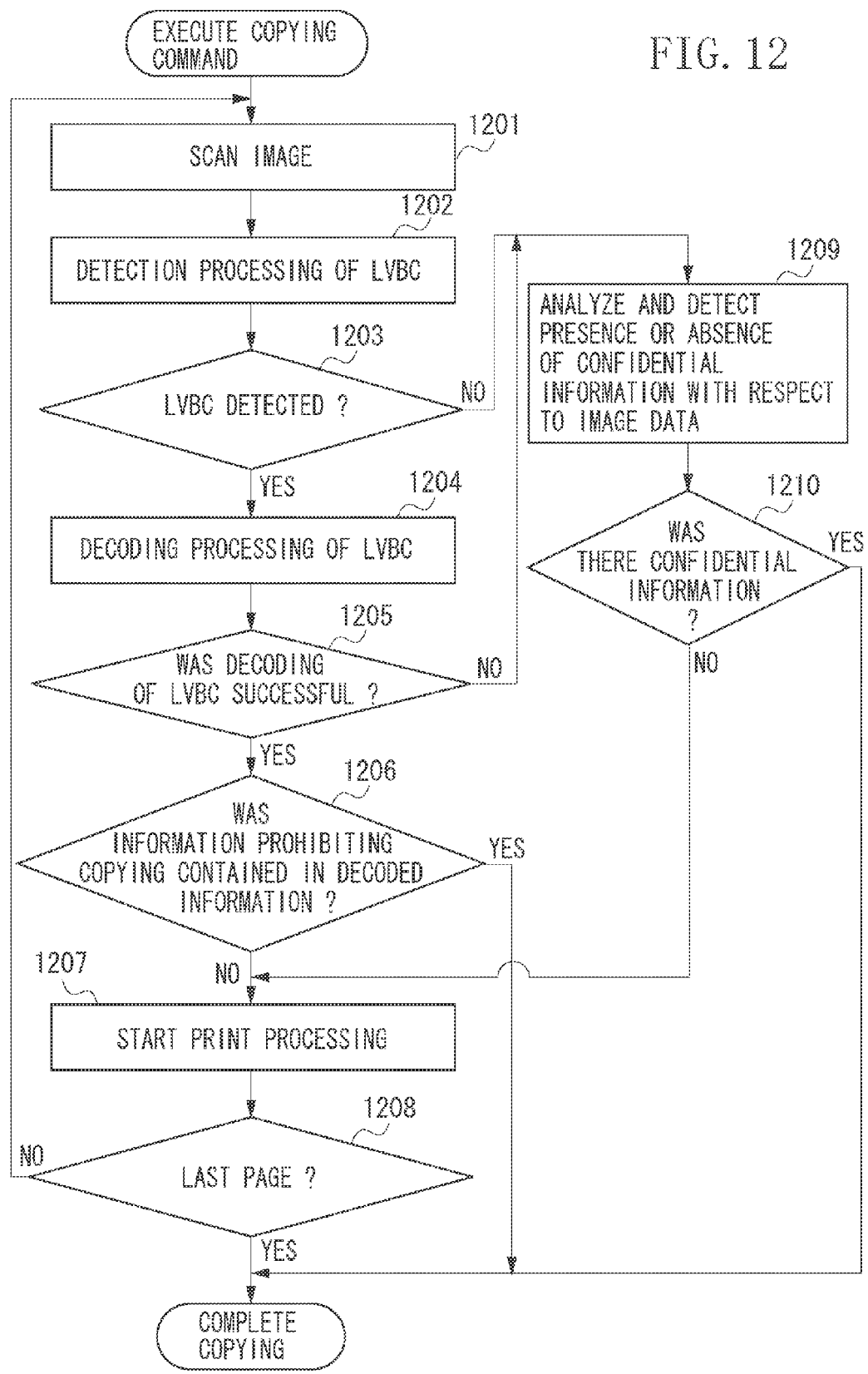
FIG. 12 is a flow chart illustrating an example of a flow of the copy control executed by the image forming apparatus.

Now, control of the copying operation carried out by the image forming apparatus 0200 is described. the image forming apparatus includes 2 determination units configured to make a determination as to copy restriction of the image to be copied, e.g., a detection unit configured to detect the LVBC and an extraction unit configured to extract the copy restricting information, and further having an illegal copy prevention function, with reference to FIGS. 3, 11 and 12.

FIG. 11 is a block diagram illustrating a configuration as to detection of the LVBC of the image forming apparatus 0200 and extraction of the copy restricting information.

The image forming apparatus 0200 includes an image reading unit 1131, an LVBC extraction unit 1132, a job control unit 1133, a set information storing unit 1134, an image processing unit 0317, a print unit 1136 and a copy restricted image pattern analysis unit 1137. The image forming apparatus 0200 further includes a copy restricted image information storage unit 1138, a copy restricted keyword analysis unit 1139, an image data storage unit 1141, a copy restricted keyword storage unit 1142 and a copy restricted image pattern storage unit 1143.

When the user locates the document on a document feeder and issues a copy start instruction through the operation unit 0221, the image reading unit 1131 starts reading the document. The image reading unit 1131 transmits thus read data of the image to be copied to the image data storage unit 1141 and the LVBC extraction unit 1132, respectively. The image reading unit 1131 includes the scanner unit 0222, the scanner I/F 0311 and the scanner image processing unit 0312 of FIG. 3.

The LVBC extraction unit 1132 controls the LVBC extraction processing unit 0309 to carry out detection of the LVBC with respect to the received data of the image to be copied and decode of thus detected LVBC. The LVBC extraction unit 1132 extracts information embedded in the LVBC according to the decoding processing and transmits the extraction result to the job control unit 1133. The job control unit 1133 decides whether the copying of the image to be copied is permitted or prohibited based on the received extraction result. Here, the user who copies cannot recognize a content of the LVBC even if the LVBC is contained in the document.

In a case where the LVBC extraction unit 1132 did not detect the LVBC, the job control unit 1133 receives information indicative of absence of the LVBC from the LVBC extraction unit 1132. Then, the job control unit 1133 which received the information indicative of the absence of the LVBC transmits a processing execution order to the copy restricted keyword analysis unit 1139 and the copy restricted image pattern analysis unit 1137, respectively.

The copy restricted image pattern analysis unit 1137, upon receiving the processing execution order, compares the image data stored in the image data storage unit 1141 with a pattern of the image to be copied which is preliminary stored in the copy restricted image pattern storage unit 1143. As a result of the comparison, in a case where the copy restricted image pattern analysis unit 1137 determines that there is at least one image pattern which matches both a copy restricted image pattern and an image pattern of the data of the image to be copied, information indicative of "copy restricting information exist" is transmitted to the job control unit 1133. In a case where the copy restricted image pattern analysis unit 1137 determines that there is no matching image pattern, information indicative of "copy restricting information not exist" is transmitted to the job control unit 1133.

A method of comparing the image patterns by the copy restricted image pattern analysis unit 1137 uses the conventional image comparison technique. Namely, any conventional technique can be used in this comparison. An example of the conventional image comparison technique includes an image pattern matching processing.

The copy restricted image pattern storage unit 1143 can store a plurality of copy restricted image patterns. Further, in a case where the copy restricted image pattern is not registered in the copy restricted image pattern storage unit 1143, the copy restricted image pattern analysis unit 1137 does not carry out the comparison of the image patterns. In this case, the copy restricted image pattern analysis unit 1137 transmits information indicative of "copy restricting information not exist" to the job control unit 1133.

The copy restricted keyword analysis unit 1139 extracts character information contained in the image data that is stored in the image data storage unit 1141 and compares thus extracted character information with the copy restricted keyword stored in the copy restricted keyword storage unit 1142. Then, as a result of the comparison, in a case where the copy restricted keyword analysis unit 1139 determines that there is at least one matching keyword between thus extracted character information and the copy restricted keyword, the information indicative of "copy restricting information exist" is transmitted to the job control unit 1133. In a case where the copy restricted keyword analysis unit 1139 determines that there is no matching keyword, information indicative of "copy restricting information not exist" is transmitted to the job control unit 1133. A method for extracting the character information by the copy restricted keyword analysis unit 1139 uses a conventional character recognition technique. Namely, any conventional method can be used in this extraction. An example of the conventional character recognition technique includes an optical character recognition (OCR) processing.

A plurality of copy restricted keywords can be registered and stored in the copy restricted keyword storage unit 1142. In a case where no copy restricted keyword is registered in the copy restricted keyword storage unit 1142, the copy restricted keyword analysis unit 1139 does not carry out the comparison processing of the keywords. At the time, the copy restricted keyword analysis unit 1139 transmits information indicative of "copy restricting information not exist" to the job control unit 1133.

Here, the copy restricting information about the image to be copied which matches the copy restricted image pattern and/or the copy restricted keyword is information of the image or the character strings contained in the document, which content the user who copies can recognize.

According to the determination results of the copy restricted image pattern analysis unit 1137 and the copy restricted keyword analysis unit 1139, the job control unit 1133 decides permission or prohibition of the copying operation. In a case where the job control unit 1133 receives the information indicative of "copy restricting information exist" from either one of the copy restricted image pattern analysis unit 1137 or the copy restricted keyword analysis unit 1139, the job control unit 1133 decides that the copying of the copy target image is not permitted. Alternatively, in a case where the job control unit 1133 receives the information indicative of "copy restricting information not exist" from both of the copy restricted image pattern analysis unit 1137 and the copy restricted keyword analysis unit 1139, the job control unit 1133 decides that the copying of the image to be copied is permitted.

In a case where the job control unit 1133 decides that the copying is not to be permitted, the job control unit 1133 transmits to the print unit 1136 a copying operation stop order. Further, the job control unit 1133 controls the operation unit I/F 0305 to cause the operation unit 0221 to display the dialog box, as illustrated in FIG. 6, to warn the user that the copying is restricted. When the print unit 1136 receives the copying operation stop order from the job control unit 1133, the print unit 1136 stops printing even when it is in printing. The print unit includes the printer I/F 0318 and the printer unit 0223 of FIG. 3.

FIG. 12 is a flow chart illustrating a flow of a copy control executed by the image forming apparatus 0200.

In step 1201, when the image reading unit 1131 receives a copy start instruction based on an operation by the user in the operation unit 0221, the image reading unit 1131 reads the document to be copied and transmits thus read data of the image to be copied to the LVBC extraction unit 1132 and an image data storage unit 1141, respectively. In step 1202, the LVBC extraction unit 1132 carries out the detection processing of the LVBC with respect to thus received data of the image to be copied.

In step 1203, in a case where the LVBC is detected from the data of the image to be copied by the LVBC extraction unit 1132 and thus it is determined that the LVBC is contained (YES in step 1203), the processing proceeds to step 1204. On the other hand, in step 51203, in a case where the LVBC is not detected by the LVBC extraction unit 1132 from the data of the image to be copied and thus it is determined that the LVBC is not contained (NO in step 1203), the processing proceeds to step 1209. In the detection processing by the LVBC extraction unit 1132, the determination as to whether or not the LVBC is contained is performed by judging whether or not a dot analysis is capable. In a case where the dot analysis is capable, it is determined that the LVBC is contained, whereas, in a case where the dot analysis is not capable, it is determined that the LVBC is not contained.

In step 1204, the LVBC extraction unit 1132 controls the LVBC extraction processing unit 0309 to carry out the decoding processing with respect to the LVBC detected from the data of the image to be copied, thereby extracting additional information embedded in the LVBC. In step 1205, the LVBC extraction unit 1132 judges whether or not the extraction processing in step 1204 was successful and the additional information embedded in the LVBC could be extracted. In a case where the LVBC extraction unit 1132 judges that the extraction processing was successful and the additional information could be extracted (YES in step 1205), the processing proceeds to step 1206. On the other hand, in a case where the LVBC extraction unit 1132 judges that the extraction processing was not successful or the additional information could not be extracted (NO in step 1205), the processing proceeds to step 1209.

In step 1206, the LVBC extraction unit 1132 determines whether or not the copy condition contained in the copy control information in the extracted additional information indicates the copy prohibition. In a case where the LVBC extraction unit 1132 determines that the copy condition does not indicate the copy prohibition (NO in step 1206), the job control unit 1133 decides to permit the copying of the image to be copied and the processing proceeds to step 1207. On the other hand, in a case where the LVBC extraction unit 1132 determines that the copy condition contained in the copy control information indicates the copy prohibition (YES in step 1206), the job control unit 1133 decides that the copying of the image to be copied is not permitted and cancels the copying operation, resulting in stopping the copying operation. Further, when stopping the copying operation, the job control unit 1133 causes the operation unit 0221 to display the dialog box illustrated in FIG. 6 to notify the user that the copying operation is stopped.

In step 1207, the job control unit 1133 transmits an order to the print unit 1136 to cause the print unit 1136 to start printing the data of the image to be copied which was transmitted to the print unit 1136 through the image processing unit 0317. In a case where the print unit 1136 has not received the data of the image to be copied from the image processing unit 0317, the print unit 1136 waits until the image processing is completed in the image processing unit 0317. Although it is not illustrated in FIG. 12, the image processing unit 0317 carries out the image processing (e.g., halftoning) which is necessary for the print unit 1136 to perform printing, on the data of the copy target image.

In step 1208, the job control unit 1133 judges whether it is the last page of the document to be copied, and, if it is the last page (YES in step 1208), the job control unit 1133 terminates the copying operation. On the other hand, if the job control unit 1133 judges it is not the last page (NO in step 1208), the processing proceeds to step 1201.

In step 1209, the copy restricted image pattern analysis unit 1137 and the copy restricted keyword analysis unit 1139 perform analysis to see if the copy restricting information is not contained in the data of the image to be copied that is stored in the image data storage unit 1141. In step 1210, the copy restricted image pattern analysis unit 1137 and the copy restricted keyword analysis unit 1139 determine whether the copy restricting information is contained in the data of the image to be copied. In a case where the copy restricted image pattern analysis unit 1137 and the copy restricted keyword analysis unit 1139 determine that the copy restricting information is contained (YES in step 1210), the job control unit 1133 judges not to permit the copying of the image to be copied and cancels the copying operation, resulting in stopping of the copying operation. Further, when the job control unit 1133 stops the copying operation, the job control unit 1133 causes the operation unit 0221 to display the dialog box, illustrated in FIG. 6, thereby notifying the user that the copying operation is stopped. On the other hand, in a case where the copy restricted image pattern analysis unit 1137 and the copy restricted keyword analysis unit 1139 determine that the copy restricting information is not contained (NO in step 1210), the job control unit 1133 decides that the copying of the image to be copied is permitted and the processing proceeds to step 1207.

As described above, the image forming apparatus 0200 in the present exemplary embodiment includes a first determination unit and a second determination unit wherein a result of the second determination unit is referred to based on a determination result of the first determination unit. Here, the first determination unit works as the LVBC extraction unit 1132, which makes a determination as to the copy restriction of the image to be copied based on the LVBC which is contained in the original document of the image to be copied and which is the two-dimensional code. In the LVBC, information which content the user cannot recognize is embedded. The second determination unit works as the copy restricted image pattern analysis unit 1137 and the copy restricted keyword analysis unit 1139, i.e., is configured to make a determination as to the copy restriction of the image to be copied based on the copy restricting information. The copy restricting information is contained in the original document as the original of the image to be copied and the user can recognize the content thereof.

As described above, the copying is restricted by using 2 different determination units. Thereby, the print product, whose copying needs to be prohibited, can be specified as copy-prohibited at the high accuracy. Accordingly, more of illegal copying can be prevented.

The determination processing by the second determination unit in the present exemplary embodiment imposes higher load in comparison with that by the first determination unit, so that more time is required. Therefore, if the second determination is made with respect to all the documents to be copied, productivity of the image forming apparatus 0200 may be degraded. In the present exemplary embodiment, the determination is made by the second determination unit only in the cases that the LVBC was not detected from the image to be copied in step 1203 and the additional information was not extracted from the LVBC in step 1205. In other words, the determination processing by the first determination unit which requires the lower processing load and the shorter processing time (i.e., the determination processing using the LVBC in the first exemplary embodiment) is carried out first. Only in a case where the information to be used in the first determination could not be detected or extracted, the determination processing by the second determination unit which requires the higher processing load and the longer processing time is carried out in order to restrict the copying. In this manner, more of illegal copying is prevented and effective copy restriction processing becomes possible.

Now, a second exemplary embodiment is described below. In the above described first exemplary embodiment, the detection processing of the copy restricting information is carried out by the copy restricted keyword analysis unit 1139 and the copy restricted image pattern analysis unit 1137 with respect to the image data from which the LVBC has not been detected, and, in a case of the "copy restricting information not exist", the copying operation is carried out. In a case where the print product printed by this copying operation is further copied by the image forming apparatus 0200, since no LVBC is contained, copy restriction processing is carried out again by the second determination unit which requires higher processing load. As described above, in a case where the print product of the first generation has already been determined as the "copy restricting information not exist" and the copying thereof is permitted, it is natural to permit the copying also to the print product of the second generation, i.e., to permit the copying of the print product twice. However, since the LVBC is not contained, the unnecessary detection processing of the copy restricting information is carried out and thus the productivity in copying the print product of the second generation is degraded.

The present exemplary embodiment is directed to omit the unnecessary detection processing of the copy restricting information and carry out the copying of the document after the second generation more efficiently when the second determination unit determines the "copy restricting information not exist", with respect to the print product subsequent to the second generation to which copying has been permitted.

Figure 13:
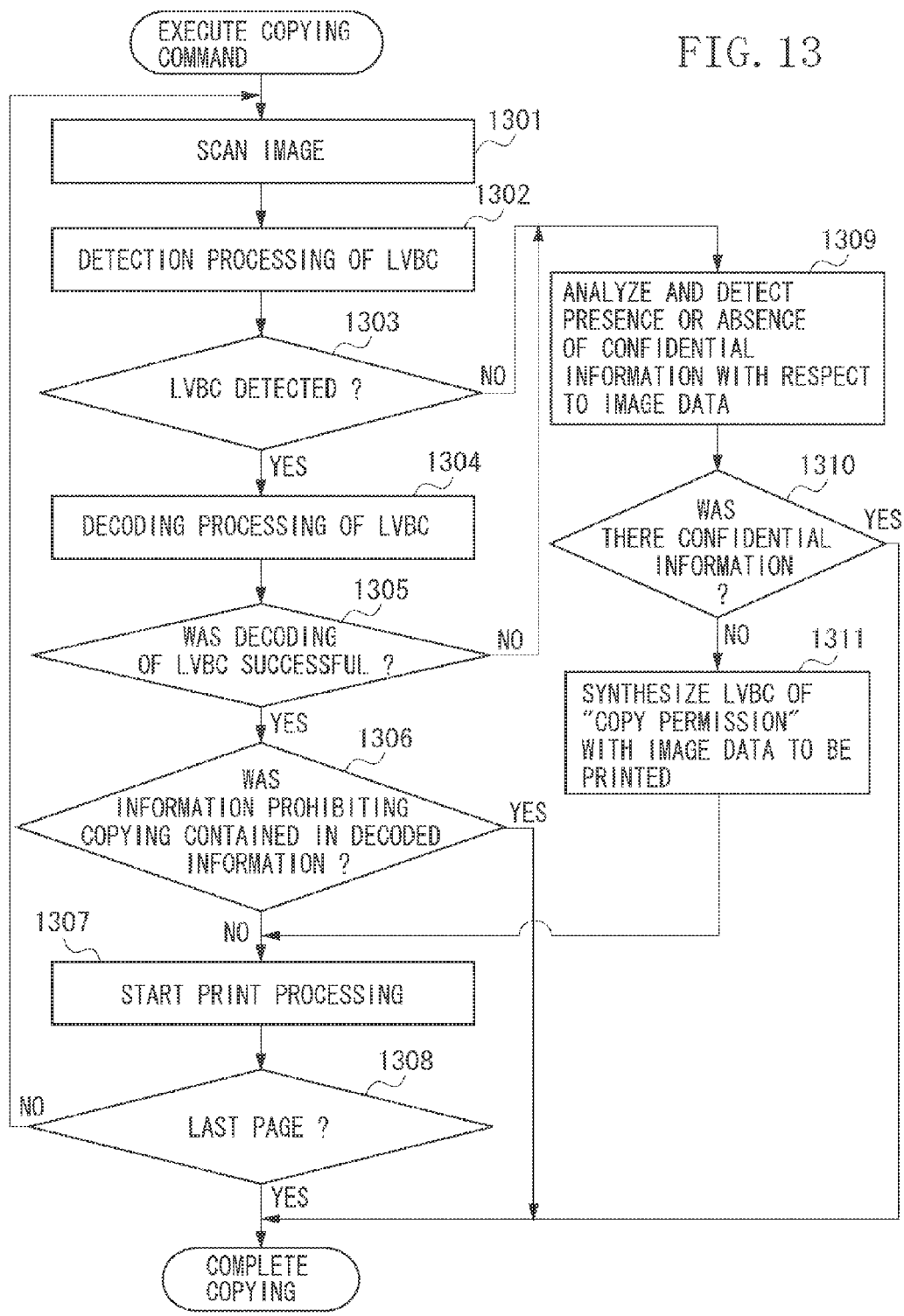
FIG. 13 is a flow chart illustrating another example of a flow of the copy control executed by the image forming apparatus.

FIG. 13 is a flow chart illustrating a flow of copy control executed by the image forming apparatus 0200. In the present exemplary embodiment, in a case where the copy restricted keyword analysis unit 1139 and the copy restricted image pattern analysis unit 1137 determine the "copy restricting information not exist", in addition to the control of the first exemplary embodiment, the LVBC of which copying is permitted is combined with the data of the image to be copied and thereafter the image data is printed. In the present exemplary embodiment, since each processing of steps 1301 through 1309 is identical to the corresponding one of the first exemplary embodiment, the description thereof is omitted here and only processing of the steps 1310 and 1311 which are not in the first exemplary embodiment is described here.

In step 1310, the copy restricted image pattern analysis unit 1137 and the copy restricted keyword analysis unit 1139 determine whether the copy restricting information is contained in the data of the image to be copied. In a case where the copy restricted image pattern analysis unit 1137 and the copy restricted keyword analysis unit 1139 determine that the copy restricting information is contained (YES in step 1310), the job control unit 1133 decides that the copying of the image to be copied is not permitted and cancels the copying operation, resulting in stopping of the copying operation. Further, when the copying operation is stopped, the job control unit 1133 causes the operation unit 0211 to display the dialog box illustrated in FIG. 6 to notify the user that the copying operation is stopped. On the other hand, in a case where the copy restricted image pattern analysis unit 1137 and the copy restricted keyword analysis unit 1139 determine that no copy restricting information is contained (NO in step 1310), the job control unit 1133 decides that the copying of the image to be copied is permitted, and the processing proceeds to step 1311.

In step 1311, the job control unit 1133 causes the LVBC image production unit 0315 to generate the LVBC in which the additional information indicating that the copying is permitted is embedded according to the set information of the LVBC held in the set information storing unit 1134. The job control unit 1133 causes the LVBC image production unit to generate image data in which thus generated LVBC is combined with the data of the image to be copied. Subsequently, the job control unit 1133 transmits the combined image data to the print unit 1136 through the image processing unit 0317, and the processing proceeds to step 1307.

In the present exemplary embodiment, in a case where the information to be used in the first determination unit which imposes only the lower processing load or the shorter processing time cannot be detected or extracted and there is no copy restricting information in the second determination unit, the information for permitting the copying for use in the first determination unit is combined to print the image data. Accordingly, in a case where the print product of the second generation to which the copying is permitted once is copied again, the determination is made by the first determination unit which imposes the lower processing load and the shorter processing time. Therefore, it is not necessary to carry out the second determination processing which imposes the higher processing load and the longer processing time. Therefore, the copying of the print product after the second generation can be carried out more efficiently.

Now, a third exemplary embodiment is described below. In the above described first exemplary embodiment and second exemplary embodiment, control is performed in a case where the copy conditions of the additional information embedded in the LVBC are the "copy permission" or the "copy prohibition". However, a copy condition of "copy permission with conditions" which permits the copying only when a certain condition is satisfied, can be set instead of the simple permission and the prohibition of the copying. In the present exemplary embodiment, the control is described in which as the copy condition contained in the LVBC, the "copy permission with conditions" is contained in addition to the "copy permission" or the "copy prohibition". As specific examples of the "copy permission with conditions", a "user authentication" in which the copying is permitted only when the user authentication is carried out correctly and a "password authentication" in which the copying is permitted only when the password authentication is carried out correctly, are described below.

Figure 14:
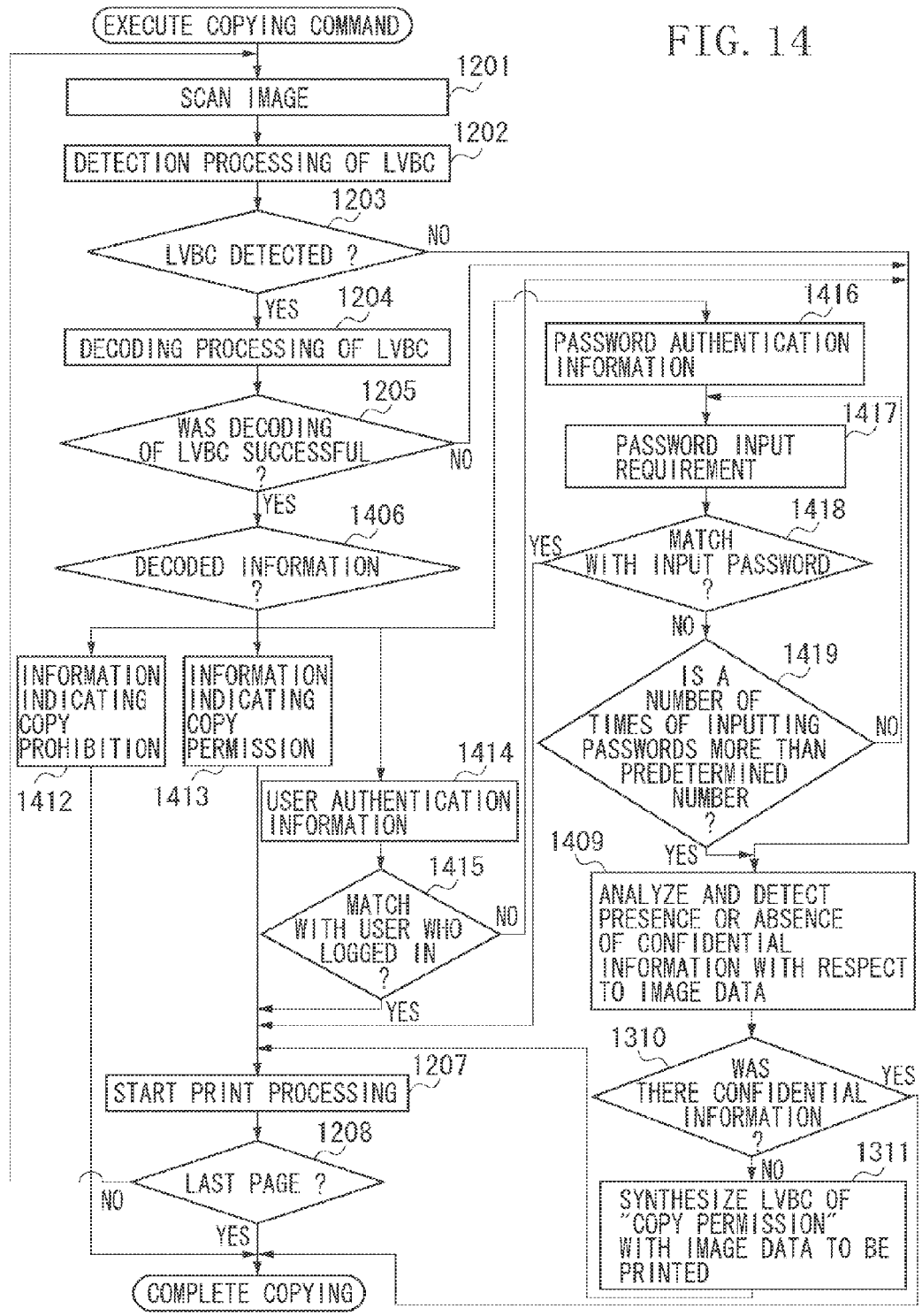
FIG. 14 is a flow chart illustrating further another flow of the copy control executed by the image forming apparatus.

FIG. 14 is a flow chart illustrating a flow of a copy control executed by the image forming apparatus 0200. In the present exemplary embodiment, in addition to the processing of the first exemplary embodiment and the second exemplary embodiment, a case that the copy condition of the additional information embedded in the LVBC is the "user authentication" or the "password authentication" is described below. Each of the processing of the steps 1201 through 1209 in the present exemplary embodiment is identical to the corresponding one of the first exemplary embodiment. Also, each of the processing of the steps 1310 and 1311 is identical to the corresponding one of the second exemplary embodiment. Therefore, descriptions of the processing identical to the first exemplary embodiment or the second exemplary embodiment are omitted, and only processing of step 1406 and steps 1412 through 1419, which are not described in the first exemplary embodiment or the second exemplary embodiment, are described below.

In step 1406, the LVBC extraction unit 1132 determines a type of the copy condition contained in the copy control information in the extracted additional information. In a case where the LVBC extraction unit 1132 determines the copy condition indicates that the copying is prohibited, the processing proceeds to step 1412. In a case where the LVBC extraction unit 1132 determines the copy condition indicates that the copying is permitted, the processing proceeds to step 1413. In a case where the LVBC extraction unit 1132 determines the copy condition indicates that the user authentication is required, the proceeding proceeds to step 1414. In a case where the LVBC extraction unit 1132 determines the copy condition indicates that the password authentication is required, the proceeding proceeds to step 1416.

In step 1412, the job control unit 1133 decides that the copying of the copy target image is not permitted and cancels the copying operation, resulting in stopping of the copying operation. When stopping the copying operation, the job control unit 1133 causes the operation unit 0221 to display the dialog box illustrated in FIG. 6 to notify the user that the copying operation is stopped.

In step 1413, the job control unit 1133 decides that the copying of the copy target image is permitted, and the processing proceeds to step 1207.

In step 1414, the job control unit 1133 decides that the user authentication is to be carried out with respect to the copy target image, and the processing proceeds to step 1415. In step 1415, the job control unit 1133 judges whether the user information embedded in the LVBC together with the copy condition matches the user information of the user who logged in the image forming apparatus 0200. In a case where the job control unit 1133 judges that pieces of the user information match each other (YES in step 1415), the proceeding proceeds to step 1207. On the other hand, in a case where the job control unit 1133 judges that pieces of the user information do not match each other (NO in step 1415), the proceeding proceeds to step 1409.

In step 1416, the job control unit 1133 decides that the password authentication is to be carried out with respect to the copy target image, and the processing proceeds to step 1417. In step 1417, the job control unit 1133 causes the operation unit 0221 to display the dialog box 0701 illustrated in FIG. 7, and requires the user to input the password. Then, in the operation unit 0221, when the password is input by the user and it is confirmed that the OK button is pressed, the processing proceeds to step 1418.

In step 1418, the job control unit 1133 judges whether the password embedded in the LVBC together with the copy condition matches the password input by the user. In a case where the job control unit 1133 judges that the passwords match each other (YES in step 1418), the proceeding proceeds to step 1207. In a case where the job control unit 1133 judges that the passwords do not match each other (NO in step 1418), the proceeding proceeds to step 1419. In step 1419, the job control unit 1133 judges if the number of the passwords the user input is equal to or more than a predetermined number. In a case where the job control unit 1133 judges that the number of passwords the user input is equal to or more than the predetermined number (YES in step 1419), the proceeding proceeds to step 1409. In a case where the job control unit 1133 judges that the number of passwords the user input is less than the predetermined number (NO in step 1419), the proceeding proceeds to step 1417.

In the present exemplary embodiment, judgment is made as to whether a condition is satisfied in a case where a type of information to be used in the first determination unit is the "copy permission with conditions" (e.g., the "user authentication" or the "password authentication"), and the determination processing by the second determination unit is carried out in a case where the condition is not satisfied. Accordingly, even in a case where the condition for permitting the copying is not satisfied, if the copy target image does not contain the copy restricting information, the user can carry out the copying. Therefore, an operation of the copy restriction can be performed more freely.

Each of the exemplary embodiments of the present invention is described above with a specific example. However, the present invention is not limited to the above described exemplary embodiments. For example, the two-dimensional code applied to the present invention may not be the LVBC but may be any two-dimensional code such as a QR code and a barcode as far as information can be embedded therein. In a case where the copying is permitted by the first determination unit in the above exemplary embodiments, the determination by the second determination is not carried out. However, the method is not limited to the one above described, but may be carried out in such a manner that, for example, the determination processing by 2 determination units are carried out at the same time after receiving the copying instruction. In this case, if it is determined that there is information that can decide the prohibition of the copying by either one of the determination processing (YES in step 1310), the copying processing may be stopped without referring to the other determination processing.

The present invention is also realized by executing the following processing. That is, software (program) which realizes functions of the above described exemplary embodiments is supplied to a system or the apparatus through a network or various kinds of storage medium, and computers (or the CPU or the MPU) of the system or the apparatus reads out the program to execute the processing. In this case, the program and a storage medium which stores the program are included in the present invention.

Each of the above described exemplary embodiments is mere example specifically representing how to carry out the present invention. The technical scope of the present invention is not restricted to these examples. More specifically, the present invention can be carried out in various manners without departing from the technological thought or main features of the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-153315 filed Jun. 29, 2009, which is hereby incorporated by reference herein in its entirety.

What is claimed is:

1. An image forming apparatus comprising:
a first determination unit configured to make a determination as to copy restriction of a copy target image based on a two-dimensional code which is contained in the copy target image generated from a print product and into which information that a user cannot recognize as content in the print product is embedded;
a second determination unit configured to make a determination as to copy restriction of the copy target image based on copy restricting information that is contained in the copy target image and that the user can recognize as content in the print product;
a deciding unit configured to decide that a determination result by the second determination unit is referred to in a case where the first determination unit determines that the two-dimensional code is not contained in the copy target image, that copying of the copy target image is permitted in a case where the second determination unit determines that the copying of the copy target image is permitted, and that the copying of the copy target image is prohibited in a case where the second determination unit determines that the copying of the copy target image is prohibited; and
an output unit configured to output the copy target image in a case where the deciding unit decides that the copying of the copy target image is permitted.

2. The image forming apparatus according to claim 1, further comprising:
a synthesizing unit configured to generate the two-dimensional code into which the first determination unit determines information for permitting the copying is embedded and to synthesize the two-dimensional code with the copy target image in a case where the second determination unit determines that the copying of the copy target image is permitted and the deciding unit decides that the copying of the copy target image is permitted,
wherein the output unit outputs the copy target image which is synthesized with the two-dimensional code by the synthesizing unit.

3. The image forming apparatus according to claim 1, wherein the deciding unit decides that the copying of the copy target image is permitted without referring to the determination result by the second determination unit in a case where the first determination unit determines that the two-dimensional code is contained in the copy target image and information for permitting the copying of the copy target image is embedded in the two-dimensional code.

4. The image forming apparatus according to claim 1, further comprising:
a judging unit configured to judge whether a condition is satisfied in a case where the first determination unit determines that the two-dimensional code is contained in the copy target image and information indicating that the copying of the copy target image is permitted with conditions is embedded in the two-dimensional code,
wherein the deciding unit decides that the copying of the copy target image is permitted without referring to the determination result by the second determination unit in a case where the judging unit judges that the condition is satisfied, whereas, the deciding unit decides whether the copying of the copy target image is permitted or prohibited with reference to the determination result by the second determination unit in a case where the judging unit judges that the condition is not satisfied.

5. The image forming apparatus according to claim 1, further comprising:
a control unit configured to control the second determination unit not to carry out the determination processing in a case where the deciding unit makes no reference to the determination result by the second determination unit.

6. The image forming apparatus according to claim 4, wherein the condition is that at least one of a user authentication and a password authentication is correctly carried out.

7. The image forming apparatus according to claim 1, wherein copy restricting information that the user can recognize as content in the print product, is information contained in at least one of an image pattern or a keyword contained in the copy target image.

8. An image forming method, comprising:
making a first determination as to copy restriction of a copy target image based on a two-dimensional code which is contained in the copy target image generated from a print product and into which information that a user can recognize as content in the print product is embedded;
making a second determination as to the copy restriction of the copy target image based on copy restricting information that is contained in the copy target image and that the user can recognize as content in the print product;
deciding that a determination result by the second determination is referred to in a case where the first determination determines that no two-dimensional code is contained in the copy target image, that the copying of the copy target image is permitted in a case where the second determination determines that the copying of the copy target image is permitted, and that the copying of the copy target image is prohibited in a case where the second determination determines that the copying of the copy target image is prohibited; and outputting the copy target image in a case where it is decided that the copying of the copy target image is permitted.

9. The image forming method according to claim 8, further comprising:

generating the two-dimensional code in which the first determination determines that information for permitting the copying is embedded and synthesizing the two-dimensional code with the copy target image in a case where the second determination determines that the copying of the copy target image is permitted and it is decided that the copying of the copy target image is permitted, wherein the copy target image which is synthesized with the two-dimensional code in the synthesizing processing is output.

10. The image forming method according to claim 8, wherein it is decided that the copying of the copy target image is permitted without referring to the determination result by the second determination in a case where the first determination determines that the two-dimensional code is contained in the copy target image and that information for permitting the copying of the copy target image is embedded in the two-dimensional code.

11. The image forming method according to claim 8, further comprising:

judging whether a condition is satisfied in a case where the first determination determines that the two-dimensional code is contained in the copy target image and that information for permitting the copying of the copy target image with conditions is embedded in the two-dimensional code, wherein it is decided that the copying of the copy target image is permitted without referring to the determination result by the second determination in a case where it is judged that the condition is satisfied, and it is decided whether the copying of the copy target image is permitted or prohibited with reference to the determination result by the second determination in a case where it is judged that no condition is satisfied.

12. The image forming method according to claim 8, further comprising:

controlling so as not to carry out the determination processing in the second determination in a case where the determination result by the second determination is not referred to.

13. A non-transitory computer readable storage medium storing a program which causes a computer to execute the image forming method according to claim 8.

* * * * *